(12) United States Patent  (10) Patent No.: US 7,918,455 B2
Chapet et al.  (45) Date of Patent: Apr. 5, 2011

(54) CHIP WITH INSERT INCLUDING AN ELECTRONIC MICROCHIP

(75) Inventors: Pierre Chapet, Gigny (FR); Gérard Charlier, Paris (FR)

(73) Assignee: Gaming Partners International, Savigny les Beaune (FR)

( * ) Notice: Subject to any disclaimer, the term of this patent is extended or adjusted under 35 U.S.C. 154(b) by 893 days.

(21) Appl. No.: 10/557,702

(22) PCT Filed: Nov. 9, 2005

(86) PCT No.: PCT/FR2005/002793
§ 371 (c)(1),
(2), (4) Date: Jan. 27, 2006

(87) PCT Pub. No.: WO2007/054626
PCT Pub. Date: May 18, 2007

(65) Prior Publication Data
US 2007/0105616 A1    May 10, 2007

(51) Int. Cl.
*A63F 9/24* (2006.01)
(52) U.S. Cl. ..... 273/148 R; 463/25; 273/237; 273/138.2
(58) Field of Classification Search .............. 463/25; 235/492; 194/214; 273/138.2, 237, 148 R; 307/149; 340/505
See application file for complete search history.

(56) References Cited

U.S. PATENT DOCUMENTS

| 1,624,335 A | 4/1927 | Greer |
| 1,935,308 A | 11/1933 | Baltzley |
| 2,410,845 A | 11/1946 | Snell et al. |
| 2,450,997 A | 10/1948 | Shann |
| 2,544,118 A | 3/1951 | Went |

(Continued)

FOREIGN PATENT DOCUMENTS

AU    6854690    9/1991

(Continued)

OTHER PUBLICATIONS

English Language Abstract EP 0815504.

(Continued)

*Primary Examiner* — Melba Bumgarner
*Assistant Examiner* — Masud Ahmed
(74) *Attorney, Agent, or Firm* — Brownstein Hyatt Farber Schreck, LLP

(57) ABSTRACT

The chip, in the general shape of a disk, of the type with a body obtained by multiple injection molding of plastics material, includes a core 14 obtained by a first plastics material injection molding operation having a central portion 24 defining the central portion of the body of said chip and a peripheral portion 31 defining, by means of radial projections 18, at least a portion of the edge of the body of the chip. The core 14 incorporates an insert 26 including a contactless electronic microchip identification device 27 that during the first injection molding operation is buried in the central portion 24 and retained at its periphery by projections or fingers attached to the injection-molding mold and defining apertures 36 in the core. The chip body includes a covering layer around the peripheral portion 31 of the core 14 obtained by a second plastics material injection molding operation to produce, with the core, the whole of the edge and the peripheral annular portion of the body of the chip. A decorated label is fixed to each face of the chip.
The chip may be used as a gaming chip or a casino chip.

26 Claims, 5 Drawing Sheets

U.S. PATENT DOCUMENTS

| | | | |
|---|---|---|---|
| 2,836,911 A | 6/1958 | Priesneyer | |
| 2,983,354 A | 5/1961 | Ember et al. | |
| 3,034,643 A | 5/1962 | Keller et al. | |
| 3,295,651 A | 1/1967 | Klackowski et al. | |
| 3,306,462 A | 2/1967 | Cruz | |
| 3,439,439 A | 4/1969 | Stimson | |
| 3,670,524 A | 6/1972 | Korwin | |
| 3,766,452 A | 10/1973 | Burpee et al. | |
| 3,862,400 A | 1/1975 | Thomson | |
| 3,882,482 A | 5/1975 | Green et al. | |
| 3,926,291 A | 12/1975 | Burke et al. | |
| 3,936,878 A | 2/1976 | Chrysler | |
| 3,953,932 A | 5/1976 | Graves | |
| 3,968,582 A | 7/1976 | Jones | |
| 4,026,309 A | 5/1977 | Howard | |
| 4,183,432 A | 1/1980 | Lemaire | |
| 4,277,774 A | 7/1981 | Fujii et al. | |
| 4,283,709 A | 8/1981 | Lucero et al. | |
| 4,371,071 A | 2/1983 | Abedor et al. | |
| 4,373,135 A | 2/1983 | Mohan et al. | |
| 4,395,043 A | 7/1983 | Gargione | |
| 4,399,910 A | 8/1983 | Gutentag | |
| 4,435,911 A | 3/1984 | Jones | |
| 4,511,796 A | 4/1985 | Aigo | |
| 4,570,058 A | 2/1986 | Havassy | |
| 4,637,613 A | 1/1987 | Bishop | |
| 4,638,171 A | 1/1987 | Gassmann | |
| 4,674,618 A | 6/1987 | Eglise et al. | |
| 4,675,973 A | 6/1987 | Siu | |
| 4,703,165 A | 10/1987 | Colodner | |
| 4,725,924 A | 2/1988 | Juan | |
| 4,755,941 A | 7/1988 | Bacchi | |
| 4,814,589 A | 3/1989 | Storch et al. | |
| 4,818,855 A | 4/1989 | Mongeon et al. | |
| 4,827,640 A | 5/1989 | Jones | |
| 4,838,404 A | 6/1989 | Smith et al. | |
| 4,926,996 A | 5/1990 | Eglise et al. | |
| 4,969,549 A | 11/1990 | Eglise | |
| 4,973,524 A | 11/1990 | Huebner et al. | |
| 4,999,742 A | 3/1991 | Stampfli | |
| 5,007,641 A | 4/1991 | Seidman | |
| 5,038,022 A | 8/1991 | Lucero | |
| 5,094,922 A | 3/1992 | Ielpo et al. | |
| 5,103,081 A | 4/1992 | Fisher et al. | |
| 5,159,549 A | 10/1992 | Hallman, Jr. et al. | |
| 5,166,502 A * | 11/1992 | Rendleman et al. | 235/492 |
| 5,179,517 A | 1/1993 | Sarbin et al. | |
| 5,216,234 A | 6/1993 | Bell | |
| 5,265,874 A | 11/1993 | Dickinson et al. | |
| 5,283,422 A | 2/1994 | Storch et al. | |
| 5,361,885 A | 11/1994 | Modler | |
| 5,367,148 A | 11/1994 | Storch et al. | |
| 5,399,847 A | 3/1995 | Droz | |
| 5,406,264 A | 4/1995 | Plonsky et al. | |
| 5,451,756 A | 9/1995 | Holzer et al. | |
| 5,487,459 A | 1/1996 | Farmont | |
| 5,498,859 A | 3/1996 | Farmont | |
| 5,561,548 A | 10/1996 | Engle | |
| 5,575,374 A | 11/1996 | Orus et al. | |
| 5,651,548 A * | 7/1997 | French et al. | 463/25 |
| 5,673,502 A | 10/1997 | Caterbone | |
| 5,735,742 A * | 4/1998 | French | 463/25 |
| 5,770,533 A | 6/1998 | Franchi | |
| 5,794,532 A | 8/1998 | Gassies et al. | |
| 5,895,321 A * | 4/1999 | Gassies et al. | 463/29 |
| 5,941,769 A | 8/1999 | Order | |
| 5,973,599 A | 10/1999 | Nicholson et al. | |
| 6,021,949 A * | 2/2000 | Boiron | 235/492 |
| 6,176,185 B1 | 1/2001 | Charlier et al. | |
| 6,255,949 B1 | 7/2001 | Nicholson et al. | |
| 6,264,109 B1 * | 7/2001 | Chapet et al. | 235/492 |
| 6,296,190 B1 * | 10/2001 | Rendleman | 235/492 |
| 6,467,413 B1 | 10/2002 | Charlier et al. | |
| 6,488,210 B2 * | 12/2002 | Schumi et al. | 235/488 |
| 6,508,466 B1 | 1/2003 | Rendleman | |
| 6,581,747 B1 * | 6/2003 | Charlier et al. | 194/214 |
| 6,659,875 B2 * | 12/2003 | Purton | 463/47 |
| 7,028,910 B2 * | 4/2006 | Reignoux et al. | 235/492 |
| 7,063,012 B2 | 6/2006 | Tollhupp | |
| 7,100,501 B2 | 9/2006 | Tollhupp | |
| 7,282,380 B2 * | 10/2007 | Maruyama et al. | 438/30 |
| 2002/0006829 A1 * | 1/2002 | Purton | 463/47 |
| 2004/0087375 A1 | 5/2004 | Gelinotte | |
| 2004/0129786 A1 * | 7/2004 | Reignoux et al. | 235/492 |
| 2004/0229682 A1 | 11/2004 | Gelinotte | |
| 2006/0027118 A1 | 2/2006 | Tollhupp | |
| 2006/0040741 A1 * | 2/2006 | Griswold et al. | 463/40 |
| 2006/0273181 A1 * | 12/2006 | Charlier et al. | 235/492 |
| 2007/0052167 A1 * | 3/2007 | Galatan | 273/148 R |
| 2007/0060237 A1 * | 3/2007 | Rowe et al. | 463/12 |
| 2007/0060311 A1 * | 3/2007 | Rowe et al. | 463/25 |
| 2007/0102526 A1 * | 5/2007 | Castaneda | 235/492 |
| 2007/0115762 A1 * | 5/2007 | Wisnudel et al. | 369/13.56 |
| 2008/0093934 A1 * | 4/2008 | Kato | 307/149 |

FOREIGN PATENT DOCUMENTS

| | | |
|---|---|---|
| DE | 8909783 | 10/1990 |
| DE | 9300173 | 4/1993 |
| DE | 4400744 | 8/1994 |
| DE | 4311561 | 10/1994 |
| DE | 2 9505951 | 7/1995 |
| DE | 4439502 | 9/1995 |
| DE | 4440744 | 5/1996 |
| EP | 0063103 | 10/1982 |
| EP | 0147099 | 7/1985 |
| EP | 0232174 | 8/1987 |
| EP | 0266497 | 5/1988 |
| EP | 0360613 | 3/1990 |
| EP | 0376062 | 7/1990 |
| EP | 0424355 | 4/1991 |
| EP | 0436497 | 7/1991 |
| EP | 0436502 | 7/1991 |
| EP | 0444373 | 9/1991 |
| EP | 0555683 | 8/1993 |
| EP | 0564051 | 10/1993 |
| EP | 0570874 | 11/1993 |
| EP | 0613103 | 8/1994 |
| EP | 0650148 | 4/1995 |
| EP | 0694872 | 1/1996 |
| EP | 0740818 | 11/1996 |
| EP | 0790848 | 8/1997 |
| EP | 0815504 | 1/1998 |
| FR | 1001412 | 2/1952 |
| FR | 2554293 | 5/1985 |
| FR | 2644268 | 9/1990 |
| FR | 2656538 | 7/1991 |
| FR | 2663145 | 12/1991 |
| FR | 2727032 | 5/1996 |
| FR | 2727548 | 5/1996 |
| FR | 2739708 | 4/1997 |
| FR | 2749093 | 11/1997 |
| FR | 2817373 | 5/2002 |
| FR | 2833102 | 6/2003 |
| GB | 1599120 | 9/1981 |
| GB | 2075732 | 11/1981 |
| GB | 2077556 | 12/1981 |
| GB | 2149623 | 6/1985 |
| GB | 2153128 | 8/1985 |
| GB | 2180086 | 3/1987 |
| GB | 2191368 | 12/1987 |
| GB | 2229845 | 10/1990 |
| SA | 9010453 | 10/1991 |
| WO | 87/04551 | 7/1987 |
| WO | 88/01082 | 2/1988 |
| WO | 91/06068 | 5/1991 |
| WO | 92/21105 | 11/1992 |
| WO | 94/16407 | 7/1994 |
| WO | 95/08164 | 3/1995 |
| WO | 96/07153 | 3/1996 |
| WO | 96/14115 | 5/1996 |

| | | |
|---|---|---|
| WO | 96/17329 | 6/1996 |
| WO | 97/27526 | 7/1997 |
| WO | 97/30414 | 8/1997 |
| WO | 99/25439 | 5/1999 |
| WO | 01/08080 | 2/2001 |
| WO | 02/47023 | 6/2002 |
| WO | 03/045661 | 6/2003 |
| WO | 03/049048 | 6/2003 |
| WO | 2005/069209 | 7/2005 |

OTHER PUBLICATIONS

English language Abstract of FR 2663145.
English language Abstract of 2727032.
U.S. Appl. No. 10/541,319, filed Jun. 30, 2005.
U.S. Appl. No. 10/547,501, filed Aug. 31, 2005.

* cited by examiner

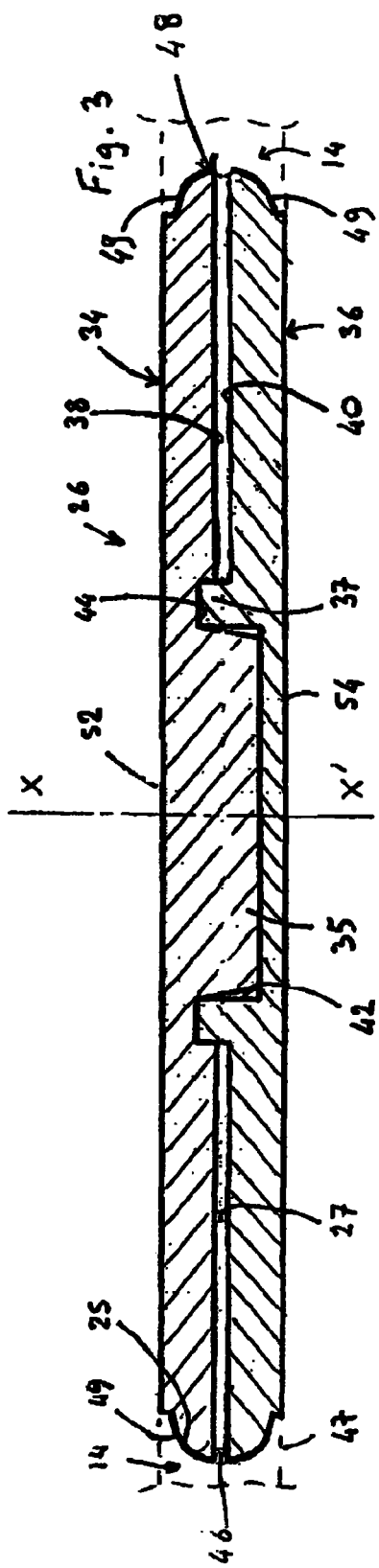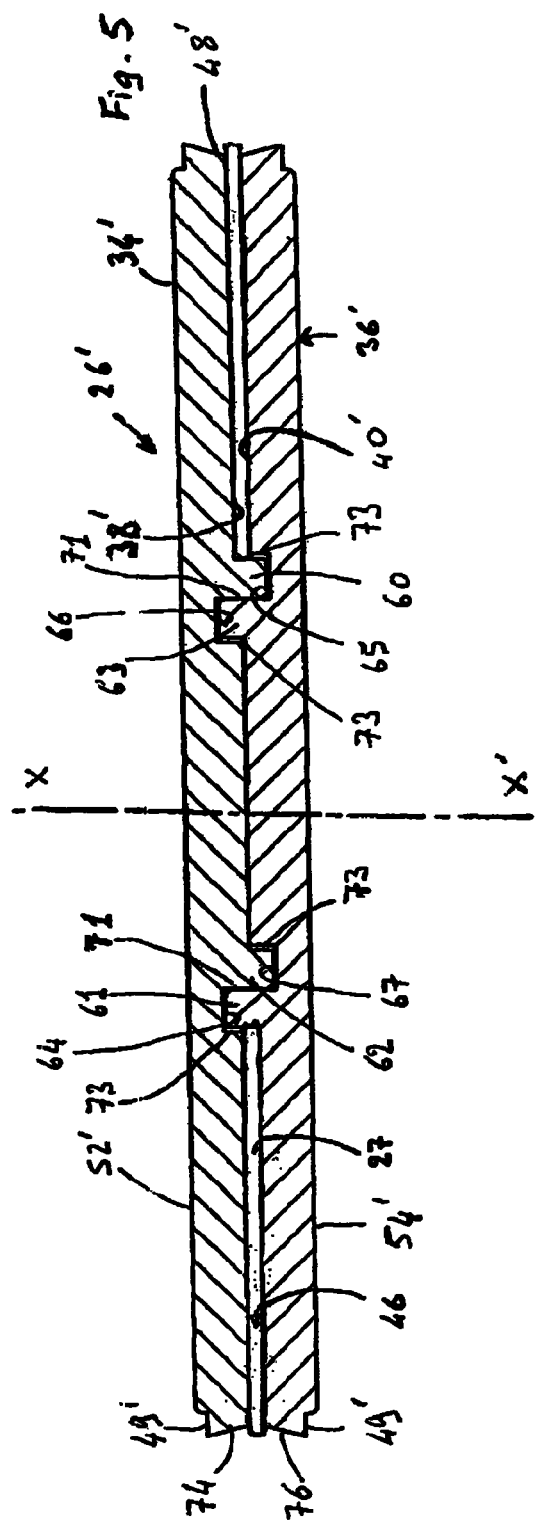

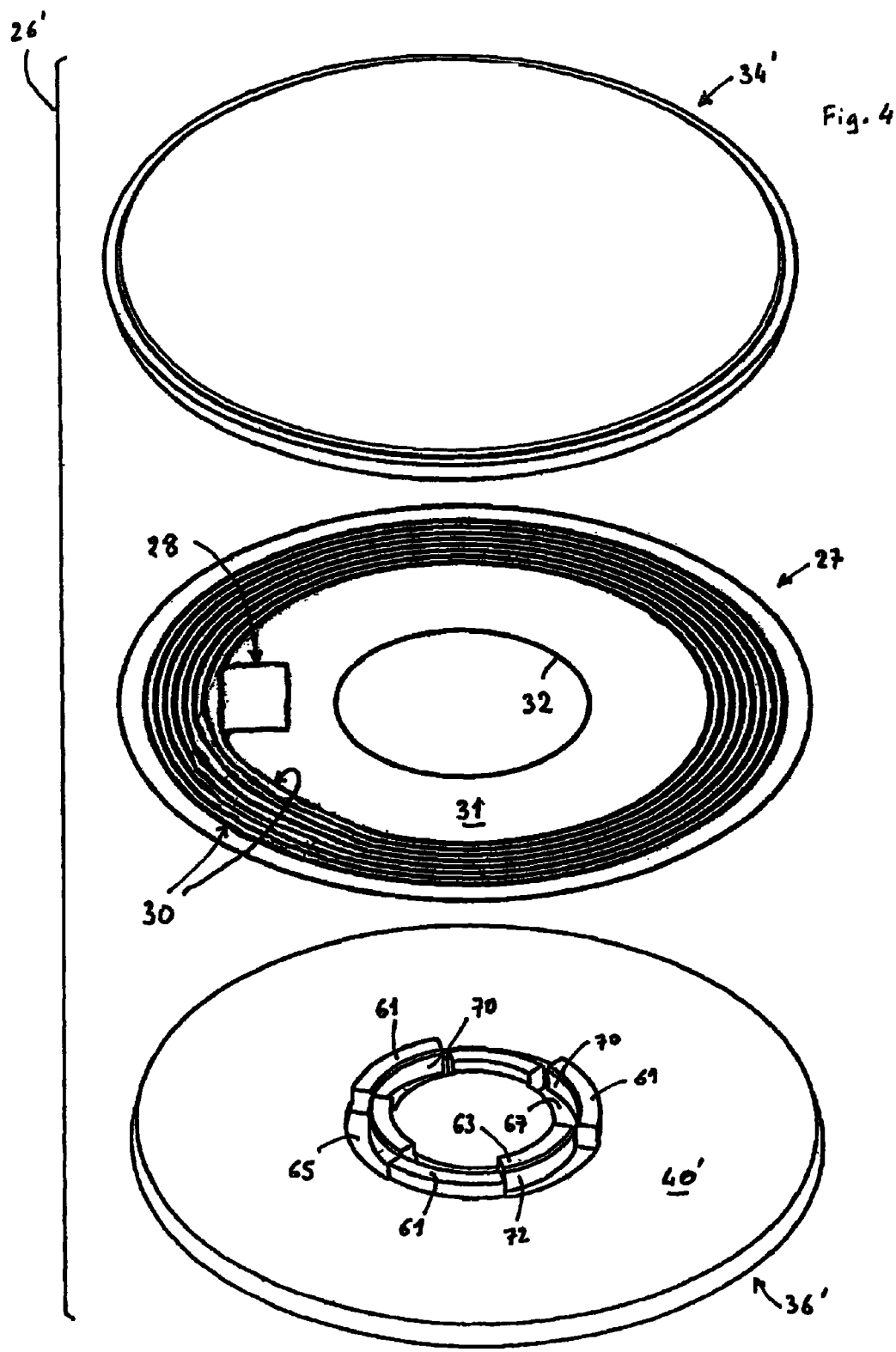

CHIP WITH INSERT INCLUDING AN ELECTRONIC MICROCHIP

The present invention relates to chips in the general shape of a disk and incorporating contactless electronic microchip identification devices, in particular gaming chips or casino chips.

Gaming chips are generally fabricated from a scratch-resistant rigid plastics material to obtain a robust overall structure. Gaming chips carry varied patterns of lines or colors to form a more or less complex decoration and to reduce the risk of counterfeiting and/or fraudulent reproduction. The use of colors and colored patterns associated with the value of the chips, especially on the edge of the chips, enables croupiers and other users quickly to identify and/or sort chips at a glance, even when they are stacked up.

To fight fraud and to facilitate the counting and tracking of chips, especially in a gaming room or casino, chips have been proposed that integrate memory electronic circuit modules in which is stored information associated with the chip, for example its identification code or number and/or its numerical value. Communication between the electronic circuit module integrated into the chip and its external read/write station is usually effected without contact, in which case a contactless electronic microchip identification device is used including an electronic circuit microchip associated with an antenna, generally a circular loop antenna, in order to be able to communicate contactlessly with the read/write station using the radio-frequency identification (RFID) technique, the microchip then combining a transceiver circuit portion with a memory circuit portion having the function of storing information.

U.S. Pat. No. 4,969,549 describes a payment token that can be used in public telephone installations and in which the electronic circuit and its antenna are encapsulated in a plastics material disk of small diameter (from 20 to 30 mm) and a conductive axial core passes through the center of the token, although the fabrication process is not specified.

U.S. Pat. No. 5,166,502 describes a casino chip in which the antenna and the electronic circuit are disposed inside a metal ballast that is in turn placed between two facial labels at the center of an injection molded plastics material ring, everything being held in place by epoxy resin and by a second injection molding operation that covers the ring and the edge of the labels. This chip, of complex structure and costly to fabricate, does not offer all of the desired security in that it is possible to access the electronic circuit, without completely destroying the structure of the chip and rendering it unusable, simply by cuffing a facial label.

The Applicant's patent EP 0694872 describes a casino chip the body whereof includes an insert in the form of a central disk consisting of a rigid plastics material shell charged with metallic particles and carrying an electronic identification device and an annular plastics material ring injection molded around the disk, the central disk also serving as a ballast by virtue of the chosen material and the quantity of the metallic charge so that the chip has the total weight that the casino requires. In a first variant, the one-piece shell is injection molded around a protective casing into which the electronic device has previously been integrated. In a second variant the shell is obtained by fastening together a cover and a hollow injection molded plastics material disk after installing the electronic identification device. Although giving good results, this fabrication technique for chips with electronic identification has its limitations, in particular with regard to the maximum diameter of the loop of the antenna to be integrated into the central disk, given the dimensions of the chips generally used in casinos and gaming rooms. Casino chips with a diameter that is generally from 39 to 50 mm use electronic microchips operating at a frequency of around 125 kHz and have an antenna diameter of the order of 21 mm. However, the Applicant has noted the benefit of using antennas with a larger active area, in particular of greater diameter, with electronic microchips operating at a frequency of around 13.56 MHz, for example loop antennas with a minimum diameter of 25 mm, at least in applications to casino chips.

US patent 2002/0006829 describes chips in which an electronic identification device using a microchip with an operating frequency of 13.56 MHz is stuck to the back of a decorative plastics material label disposed in a cavity provided on the lateral face of the chip. Like the chip that is the subject matter of U.S. Pat. No. 5,166,502, this structure does not offer all the desired security in that it is possible to access the electronic circuit without completely destroying the structure of the chip and rendering it unusable simply by cutting the facial label. What is more, being cut out from a thin sheet of plastics material, the label does not provide sufficient protection against light or analogous radiation (in particular UV radiation), to which some 13.56 MHz microchips seem relatively sensitive.

An object of the invention is to propose chips with a contactless electronic identification device, in particular casino chips, in the general shape of a disk whose body includes a central insert the structure whereof allows the implantation of an electronic microchip with an enlarged active area antenna whilst at the same time offering the required protection of the electronic identification device.

To this end the invention proposes a chip in the general shape of a disk, including a body having a central aperture in which is disposed an insert including a contactless identification device incorporating an electronic microchip and an associated antenna, characterized in that the insert includes two rigid plates fastened or fitted together in their central portion to define between them a peripheral annular area in which said identification device is disposed.

As described in detail hereinafter, the structure of an insert of the invention enables the active area of the antenna of the microchip to be increased at the same time as assuring good protection of the identification device between the two rigid plastics material plates. In particular, the invention prevents all possibility of fraudulent replacement of the insert without completely destroying the chip and rendering it unusable. Finally, the disposition of the contactless electronic microchip at a median position within the thickness of the insert of the chip protects the latter from light and UV radiation and facilitates contactless radio-frequency identification (RFID) of stacks or columns of chips.

In a preferred embodiment of the chip of the invention, the central portion of the inside face of at least one of the plates has at least one central projection for defining said peripheral annular area around the projection or said projections with a small distance between the inside faces of the plates.

In a first variant, said antenna is carried by a thin insulative film disposed between the two plates having at least one central aperture through which the or at least one of said central projections passes. As described in more detail hereinafter, it is possible to obtain a distance between the plates of the order of two tenths of a millimeter. This limits the thickness of the insert and thus of the chip, which casinos sometimes require, increases the thickness and the weight of the plates forming the insert, or enables the insertion of one or two detectable-film patches.

In another variant the thin film is fixed by means of an adhesive to the inside face of at least one of the plates. All or part of the antenna is advantageously obtained by depositing conductive material on the thin insulative film.

In another variant of the chip of the invention, the plates are fastened and/or fitted together at the level of the central projections. The central projections are advantageously arranged on each inside face of the plates in two concentric and angularly offset crenelated rings alternating with groove portions on the inside faces of the plates and adapted to receive the corresponding projections on the other face, the heights of the projections and the depths of the grooves being selected to form the peripheral annular area, in particular with a small distance, receiving the identification device when the two plates have been assembled together.

In another variant of the chip of the invention, at least one of the plates carries at the periphery of its inside face an annular abutment to protect the identification device from crushing and/or ingress of material into the peripheral annular area. This further enhances the protection of the contactless electronic identification device.

According to yet a further variant of the chip of the invention, the insert is generally disk-shaped and the antenna is in the form of a loop with a diameter from 25 to 30 mm. Said microchip advantageously operates in a frequency range from 10 to 17 MHz or from 2 to 5 GHz.

In yet a further variant of the chip of the invention, the insert includes between the two plates two oriented detectable-film patches of active material or alloy sensitive to electromagnetic radiation, the orientation of the two detectable films being crossed, preferably at substantially 90°. This in conjunction with detector portals at the entrances to the gaming rooms of casinos offers good protection against theft of chips.

In yet a further variant of the chip of the invention, the body of the chip is made from plastics material injection-molded around said insert and overlapping the periphery of the insert and/or with entry of material into the edge of the insert. The insert in particular has a beveled or rounded edge and/or an edge in which a groove is formed. The plates are advantageously made from plastics material optionally containing weighting charges compatible with contactless RFID transmission.

In yet a further variant of the chip of the invention, the body of the chip includes on each face a cavity into which is fixed a label carrying a decoration and/or a mark and/or a hologram.

The chip of the invention as defined above and/or in all its variants or embodiments constitutes a gaming chip or a casino chip.

The invention also relates to an insert with a contactless electronic microchip identification device as defined hereinabove in all its variants.

The invention also relates to a method of fabricating a body of a chip of the invention including at least the following operations:
  injection molding from an optionally charged plastics material two insert plates with at least one central fastening projection;
  placing the contactless electronic microchip identification device on the inside face of one of the two plates and fixing the thin film carrying the microchip and the antenna of the identification device to the corresponding plate by means of an adhesive;
  assembling the two plates around the identification device to produce the insert;
  placing the insert in a first injection molding mold, the two half-shells whereof define a first imprint corresponding to the core of the body of the chip around said insert at the center of the first imprint;
  injection molding the core of the chip;
  placing the core of the chip in a second injection molding mold, the two half-shells whereof define a second imprint corresponding to the whole of the body of the chip or virtually the whole of the body of the chip;
  injection molding the covering layer;
  injection molding any edge inclusions necessary to complete the body of the chip; and
  optionally trimming the chip body to perfect the edge of the chip.

Other objects, features and advantages of the present invention will become apparent on reading the following description of various preferred embodiments of chips of the invention given by way of nonlimiting example and with reference to the appended drawings, in which:

FIG. 3 is a diagrammatic view in diametral section of a first variant of an insert used in the chip shown in FIGS. 1a and 1b;

FIG. 4 is a diagrammatic exploded perspective view of a second variant of an insert used in another chip of the type shown in FIGS. 1a and 1b;

FIG. 5 is a diagrammatic view in diametral section of the second variant of the insert, shown in FIG. 4, after assembly;

Figure 1A:
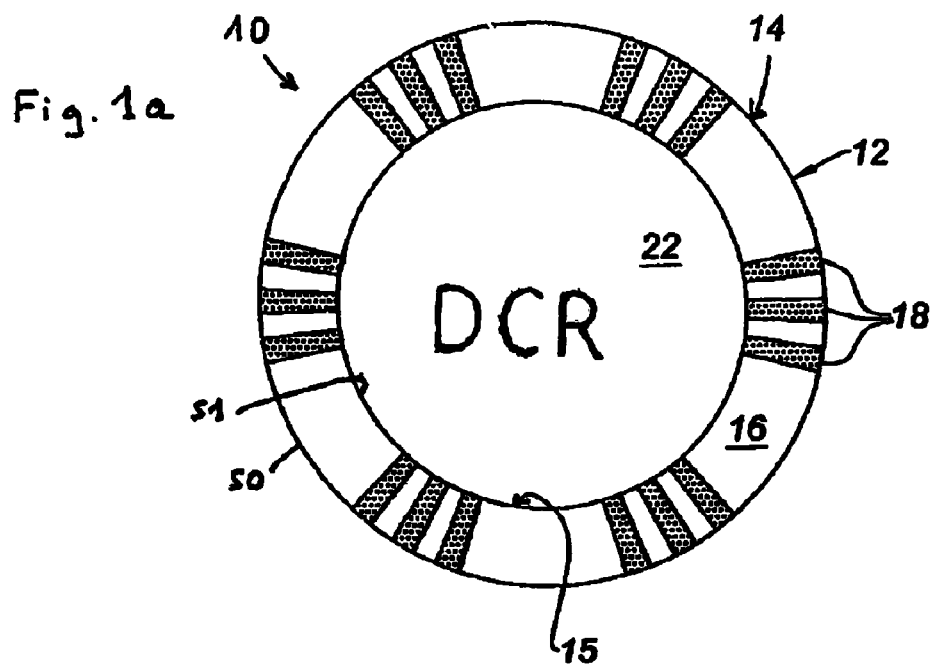
FIGS. 1a and 1b are respectively a diagrammatic front view and a side view showing the edge of a preferred embodiment of a gaming chip of the invention, the plastics material body whereof is obtained by two injection molding operations.
Figure 1B:
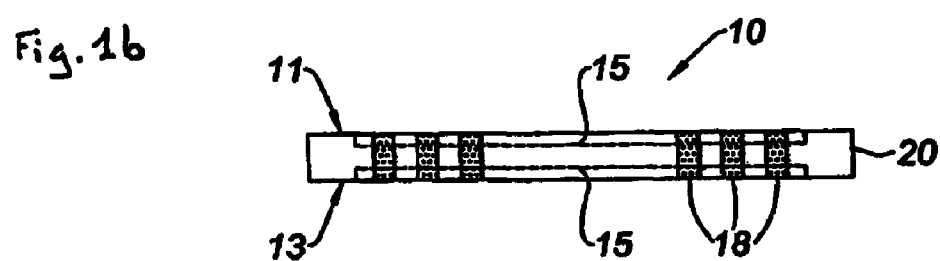

In a first embodiment of the invention the multiple-injection-molded gaming chip 10 in the shape of a disk of colored plastics material, shown in FIGS. 1a and 1b, has a body 12 consisting of a core 14 carrying an insert 26 including a contactless electronic microchip identification device 27 (see FIGS. 3 and 6 in particular) and obtained by a first operation of injection molding a plastics material of a first color (represented diagrammatically in dashed outline to make FIGS. 1a-1b easier to understand) and covered at its periphery by a covering layer 16 obtained by a second operation of injecting molding a plastics material of a different color, the core 14 carrying at its periphery radially and/or laterally extending projections 18 flush with the surface of the covering layer 16 on the faces 11 and 13 and on the edge 20 of the chip. In the present example the three projections 18 are parallel to the axis of the chip 10 (perpendicular to the edge 20 to form a two-color pattern of five colored bars). It is therefore possible to produce colored face and/or edge decorations in the mass of the body of the chip, adapted in particular to be distinguished visually, to combat counterfeiting. These patterns are conventionally repeated on the edge 20 (for example six times) and equi-angularly distributed in the circumferential direction, in particular to enable visual or optical identification of the chip regardless of its orientation.

The chip is completed by fixing into the shallow central cavity 15 on each face 11 and 13 a plastics material label 22 carrying a decoration, for example a printed or screen-printed decoration (represented diagrammatically in FIG. 1 by the symbol DCR), and/or a mark (for example that of the casino) and/or a hologram.

Figure 2:
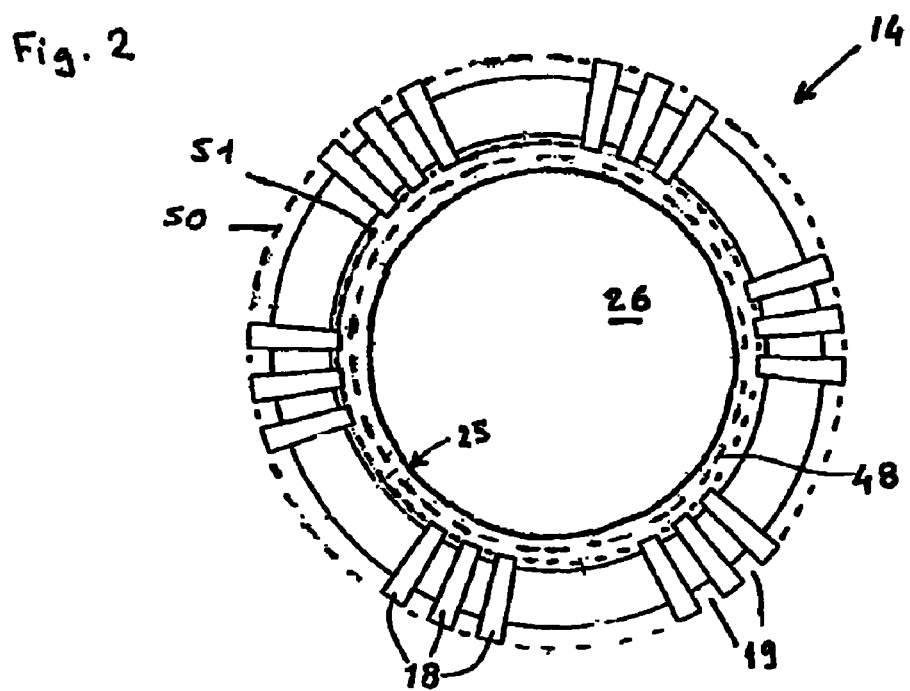
FIG. 2 is a diagrammatic front view of the core of the chip shown in FIGS. 1a and 1b, as obtained by the first injection molding operation.

The invention is not limited to two-color chips, of course, but relates equally to single-color chips made in one injection molding operation (the core 14 and the layer 16 being combined) and chips involving three, four or more injection molding operations in which at least one additional plastics material of a different color to that of the preceding injection molding operations is injection-molded directly into the housings 19 defined by the hollow spaces between the projections 18 (these are visible in FIG. 2).

Figure 6:
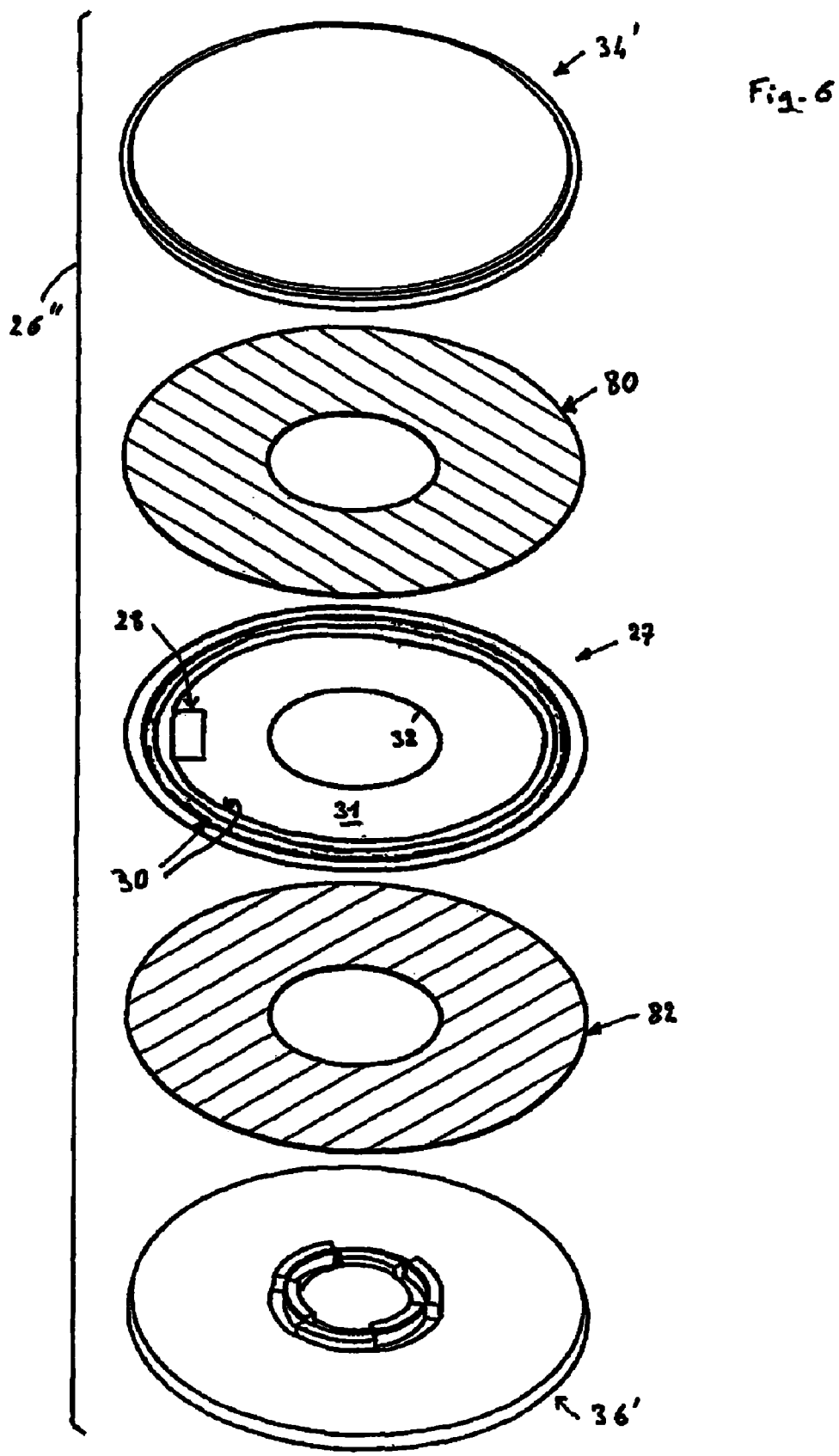
FIG. 6 is a diagrammatic exploded perspective view of another embodiment of the second variant of the insert, shown in FIGS. 4 and 5.

As shown in FIGS. 2 and 3, the core 14 of the body 12 has a generally annular shape the central aperture 25 whereof receives the circular insert 26 carrying the contactless electronic microchip identification device 27 (or electronic identifier) shown in section in FIG. 3 and consisting primarily of an electronic circuit 28 with a radio-frequency identification (RFID) transmitter-receiver fixed to a thin film 31 and a circular antenna 30 obtained by depositing conductive material onto the thin film 31 (for example electrolytic deposition followed by partial chemical etching). FIGS. 4 and 6 are perspective views of the RFID device 27 in which the antenna 30 is represented purely diagrammatically by a series of concentric circles to show the position of the antenna 30 at the periphery of the thin film disk 31. By way of nonlimiting example the film 31, which is a flexible thin film in the present example, is a polyethylene terephthalate (PET) polyester film 40 microns thick. Although this is not shown in the figures, the thin film 31 is covered on one or both faces, preferably the face carrying the antenna deposit, with an adhesive film for sticking the identification device 27 to the inside face of one of the two plates 34 and 36 of the insert 26 and additionally having the function of protecting the antenna, in particular against crushing. Moreover, the thin film 31 has a central aperture 32 for positioning the identification device 27 relative to the insert 26 in the manner explained hereinafter. The RFID device 27 as a whole takes the form of a flexible thin film with a maximum thickness of the order of 0.2 mm and a diameter of the order of 26.5 mm for an effective diameter of the antenna 30 of 25 mm and an aperture 32 of approximately 10 mm diameter.

The electronic identification device 27 generally includes an electronic circuit 28 incorporating a PROM containing information relating to the chip and/or the associated person or object, for example a fixed numerical or alphanumerical identification code of 64 bits (including one or more fields such as: serial number, product identification, batch or location, a numerical value associated with the chip, etc.), and an RFID transmitter-receiver 28 with a peripheral circular antenna adapted to be fed by inductive coupling with modulated waves from a reading station (not shown). In practice, the transmitter-receiver is adapted to exchange data contactlessly by means of modulated waves with a reading station at a distance from it (for example a distance from 15 cm to 2 m), the operating frequency being from 10 kHz to 5 GHz, to cover in particular the 125 kHz, 13.56 MHz and 2.45 GHz bands. The electronic identification device 27 with memory combats theft and/or facilitates management and inventory of a batch of objects in a defined space (storage areas, warehouses, stores), for example. The electronic identification device 27 with non-reprogrammable (read-only) memory can of course be replaced by a reprogrammable device with changeable coding, with the facility for reading and writing memory without departing from the scope of the invention. For example, the microchip 28 is of the Magellan type from INFINEON (Germany) operating at a frequency of 13.56 MHz.

The insert 26, shown diagrammatically in FIG. 3 (which is not to scale to facilitate understanding of the diagram), is formed of two rigid disk-shaped plates 34, 36 fastened to or fitted in the central portion by means of facing central projections 35, 37 carried by the corresponding inside faces 38, 40 of the plates 34 and 36, respectively. As shown in FIG. 3, and in a particular embodiment described here by way of nonlimiting example, the projection 37 on the plate 36 includes a central cavity 42 receiving the projection 35 on the plate 34, the annular projection 37 being received in an annular groove 44 on the inside face 38 of the plate 34, the whole being positioned coaxially with the axis XX' of the insert 26 (and consequently of the body of the chip 12). The relative axial dimensions (the heights of the projections 35 and 37 and the depths of the cavity 42 and the groove 44) are such that, once assembled or fitted, the two plates 34 and 36 define between them a peripheral annular area 46 defining a small spacing in which the identification device 27 is accommodated, with the annular projection 37 projecting through the aperture 32. For example, the insert 26 has a diameter of 27 mm, a thickness of 2.5 mm and a spacing of 0.2 mm between the plates in the annular area 46, although it should be noted that it is possible instead to provide a variant (not shown) with a small housing for the microchip 28 on the inside face of one of the plates to prevent all risk of crushing the latter.

FIG. 2 shows the body of the chip 12 at the end of the first injection molding operation, i.e. the core 14 before it is covered by the layer 16 whose contours 50 and 51 are shown in dashed line in FIG. 2. The inside contours 51 define on each face of the chip the shallow central circular cavity 15 (of the order of 0.5 mm deep) serving as a housing for the decorated plastics material label 22 fixed to the chip (as shown in dashed line in FIG. 1b). Inside the cavities 15, the injection molded core 14 (shown partly in section and in dashed line in FIG. 3) is flush with the outside faces 52 and 54 of the plates 34 and 36 (which include peripheral shoulders 49 in the manner shown in FIG. 3) to define on either side of the insert 26 a covering flange 47, the circular edge 48 of the insert 26 being also shown in dashed line in FIG. 2.

Of course, the invention is not limited to the circular shape of the insert, the RFID device and a corresponding antenna, but covers any appropriate variant, in particular with polygonal shapes, preferably with an axis of axial symmetry to facilitate the injection molding of the body of the chip, in this example the core 14, around the insert 26.

Without limitations, chips of the invention take the form of a disk, generally with a diameter from 39 to 50 mm and a thickness of the order of 3.3 mm, for example. The edge of the chip may be chamfered, have rounded edges or simply have a straight profile, in particular if it is required to be able to read the edge of the chips optically. If necessary the chamfered or straight profile is completed by trimming on a grinding machine or lathe.

The plastics materials used for injection molding chips fabricated using the invention, in particular the gaming chip 10, are obtained from a basic polymer that is appropriately charged (in particular with weighting and colored materials) selected from:
 polymethyl methacrylate (PMMA);
 acrylonitrile-butadiene-styrene (ABS);
 polyamides and copolymers thereof;
 polyacetal and acetal copolymers (POM/polyoxymethylene);

polyphenylene sulfide (PPS);
polyalkylene terephthalates, in particular polybutylene terephthalate (PBT);
thermoplastic polyurethanes (PUR);
vinyl polymers, polyvinyl chloride (PVC);
polyolefins, in particular polyethylenes (PE) and polypropylenes.

There is used for the body of the chip a 6 or 6,6 polyamide charged with up to approximately 70% by weight of barium sulfate or barite powder to weight it, as a nonlimiting example. Each injection molding operation is carried out at a pressure from 800 to 1400 bar, an injection temperature of 280/300° C. and a mold temperature of approximately 50° C. This composition can also be used for the inserts 26 intended for lightweight chips (9 to 10 g).

The compositions may vary, of course, in particular in terms of the charges incorporated into the materials used for the diverse injection molding operations: for example in weighting charges (barite, metal powders, zinc oxide, etc.) and in coloring agent charges (zinc oxide, etc.) to obtain the color required for each injection molding operation, noting that the charges used for the inserts are chosen to be compatible with contactless RFID transmission. With particular regard to the inserts 26 intended for the heaviest chips (13 to 14 g), a 6 polyamide charged with tungsten and/or copper powder (up to approximately 80% by weight) or with small bronze balls is used.

The invention also relates to a method of fabricating the body 12 of a chip of the invention defined in all its variants described herein and including at least the following operations:
injection-molding from an optionally charged plastics material two insert plates 34, 36 with at least one central projection;
placing the contactless electronic microchip identification device 27 on the inside face of one of the two plates and fixing the thin film 31 carrying the microchip and the antenna of the identification device 27 to the corresponding plate by means of an adhesive;
assembling the two plates 34, 36 around the identification device to produce the insert 26;
placing the insert in a first injection molding mold, the two half-shells whereof define a first imprint corresponding to the core 14 of the body of the chip around the insert 26 at the center of the first imprint;
injection-molding the core 14 of the chip;
placing the core 14 of the chip (with the insert 26) in a second injection molding mold, the two half-shells whereof define a second imprint corresponding to the whole of the body 12 of the chip or virtually the whole of the body 12 of the chip;
injection-molding the covering layer 16;
injection-molding any edge inclusions necessary to complete the body of the chip; and
optionally trimming the chip body 12 to perfect the edge 20 of the chip.

The chip is optionally terminated by placing the two decorative labels 22 in the cavities 15.

Without departing from the scope of the invention, the insert 26 may be assembled in various ways, in particular, by way of nonlimiting example, by directly fastening the central portions of the two plates together (for example by gluing them together, in particular using epoxy resin, ultrasound welding, etc.), by forcible fitting, fitting with clipping of the central projections, or fitting and fixing the plates by double-sided adhesive disposed on the two faces of the film 31 so as to cooperate with each of the internal faces of the plates 34 and 36.

As can be seen in FIG. 3, the edge of the insert 26 is rounded (or beveled on the outside) and the injection molded core 14 covers the rounded portions (the shoulders 49) so that it is flush with the outside faces of the plates 34 and 36. Without departing from the scope of the invention, however, the edge may be straight, beveled or rounded and the core 14 injection molded with a covering material with an increased thickness or shoulder relative to the external faces of the plates to form a continuous or discontinuous ring around the periphery of the insert 26. Moreover, if necessary, at least one of the plates 34, 36 may have at the periphery of its inside face an annular abutment (not shown) to prevent ingress of injected material into the peripheral annular area 46 or crushing of the identification device 27.

FIGS. 4 and 6 relate to a second variant of the insert used in chips of the invention, in particular in a chip of the type shown in FIGS. 1a and 1b and described hereinabove. This insert 26' is very similar to the insert 26 and will not be described in detail again (likewise the corresponding chips), given that identical or quasi-identical elements of the inserts and the corresponding chips carry the same reference numbers and that analogous elements carry the same reference numbers primed (').

As shown in FIG. 4, the insert 26' consists of two injection-molded rigid plastics material plates 34' and 36', where applicable charged to weight them, as referred to hereinabove, between which is disposed and adhesively fixed the contactless electronic microchip identification device 27 described hereinabove with the microchip 28 and its antenna 30 associated with the thin film 31. Compared to the insert 26, the insert 26' is characterized by the following points:

i) The two plates 34' and 36' are identical and interchangeable to reduce fabrication costs, in particular thanks to the use of a single injection molding mold for the insert 26', rather than two molds.

ii) The central projections 60, 61, 62 and 63, adapted to project through the aperture 32 in the film 31, are arranged on each inside face 38' (and 40') in two concentric and angularly offset crenelated rings, alternating with groove portions 64, 65, 66 and 67 on the inside faces of the plates 34' and 36' and intended to receive the corresponding projections of the other face, the heights of the projections 60-63 and the depths of the grooves 64-67 being chosen to produce, once the two plates have been assembled together, the peripheral annular area 46, with a slight spacing, receiving the identification device 27. As shown in detail in FIGS. 4 and 5 (the first of which shows the inside face 40' of the plate 36'), each external crenelated ring, the diameter whereof is made slightly less than that of the aperture 32, includes three equi-angularly distributed projections 60, 61 having an axis XX' of ternary symmetry and spaced by three groove portions 64 and 65 subtending an angle at the center slightly greater than that of the projections 60, 61. Similarly, each crenelated internal ring, adjacent the crenelated external ring but offset relative thereto by an angle at the center of 60°, includes three equi-angularly distributed projections 62, 63 having an axis XX' of ternary symmetry and spaced by three groove portions 66 and 67 subtending an angle at the center slightly greater than that of the projections 62, 63. Accordingly, once the insert 26' has been assembled by fitting the grooves and projections, the central external projections 60 and 61 respectively project into the external grooves 65 and 64 and the central internal projections 62 and 63 respectively project into the internal grooves 67 and 66. As shown by way of nonlimiting example in FIG. 5, the fitting is effected forcibly by bearing down on bearing areas 71 between the cylindrical internal walls 70 of the central external projections 60 (and 61) and the cylindrical external walls 72 of the central internal projections 63 (and 64), small clearances 73 being further provided opposite these bearing areas 71 to allow slight deformation of the central projections during this forcible fitting, if necessary. Of course, the two plates 34' and 36' may be fastened together in any other manner, in particular by gluing or welding them together.

iii) The edge 48' of the insert 26' is re-entrant at its center to allow the outside edge of the film 31 to project slightly. To this end, the peripheries 74 and 76 of the plates 34' and 36' are beveled on the inside and the external faces 52' and 54' of the plates 34' and 36' have small shoulders 49' designed to be covered by the injection-molded plastics material of the body of the chip during fastening together of the insert 26' and the body of the chip in the manner described hereinafter with reference to FIGS. 7a, 7b and 7c.

FIG. 6 is an exploded view of an insert 26" that is an alternative to the insert 26' and in which two oriented detectable-film patches 80, 82 of an active material or alloy sensitive to electromagnetic radiation are disposed on either side of the identification device 27, the orientations of the two detectable films of the patches crossing at substantially 90°. The patches 80 and 82 also have one or both faces covered with adhesive to facilitate assembly of the insert 26", as the distance between the inside faces of the plates 34' and 36' can be increased slightly to allow for the thickness of the two patches and prevent crushing of the identification device 27.

Figure 7A:
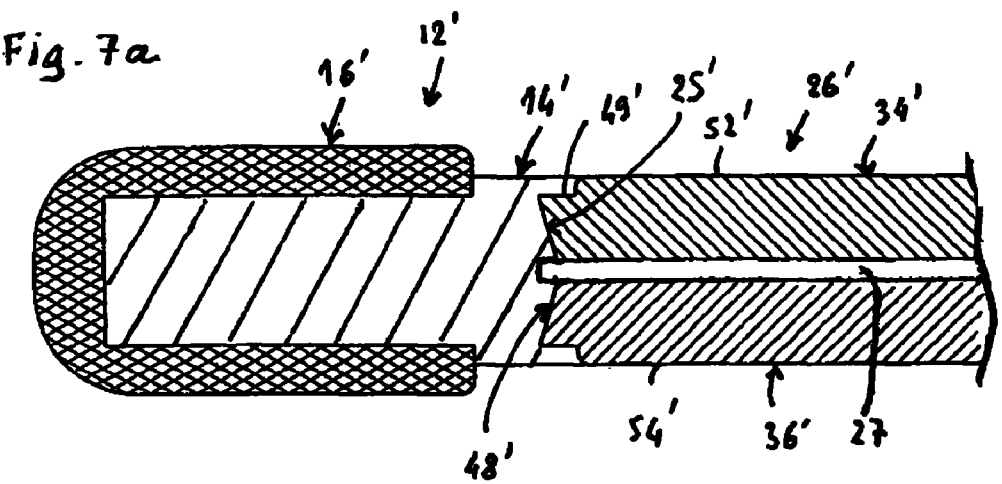
FIGS. 7a, 7b and 7c each represent a partial view in diametral section of chips of the invention with a body produced by two successive injection molding operations and incorporating the second variant of the insert.
Figure 7B:
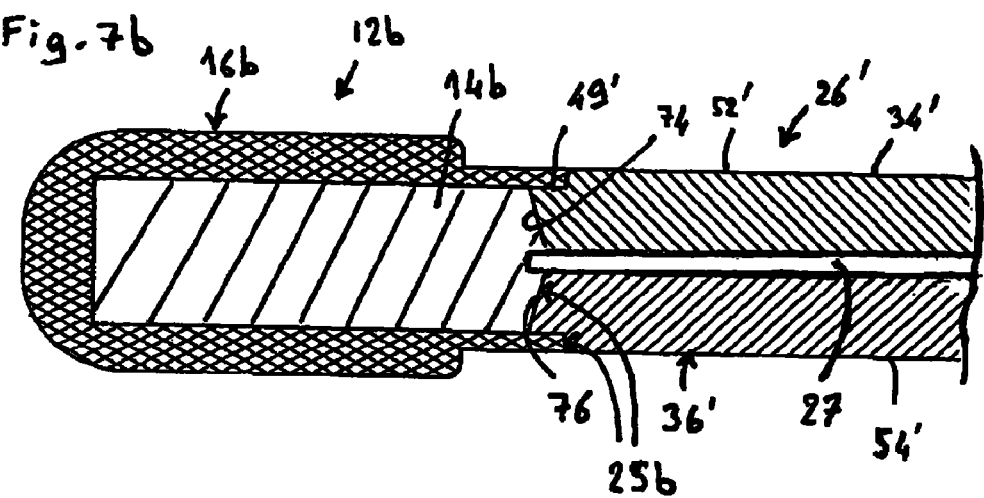
Figure 7C:
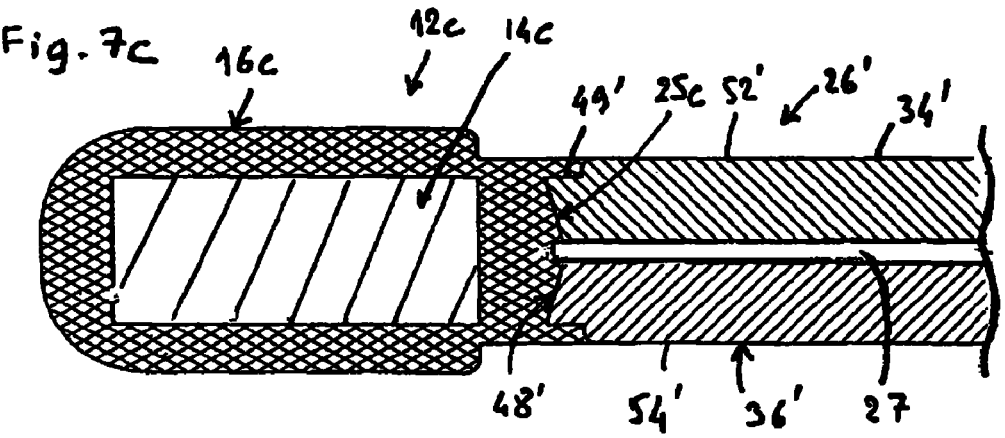

FIGS. 7a, 7b and 7c show the fastening of the insert 26' into the central opening 25', 25b, 25c of an annular chip body made by double injection molding with a core (first injection molding operation) and a covering layer (second injection molding operation).

FIG. 7a shows a chip structure substantially identical to that of the chip 10, and in particular in which the body 12' includes a core 14' injection-molded around the edge 48' of the insert 26' that covers the shoulders 49' of the insert 26' flush with the outside faces 52', 54' of the insert. The body/insert fastening is effected at the level of the central aperture 25' of the core 14' (coinciding with the central aperture of the body 12'), which core 14' is partially covered by the layer 16' during the second injection molding operation.

FIG. 7b shows a chip structure similar to that of the chip 10, but in which the body/insert fastening, again effected in the central aperture 25b of the body 12b of the chip, is effected at the level of the central aperture of the core 14b and the central aperture of the layer 16b. In particular the body 12b includes a core 14b injection-molded around the central portion of the edge of the insert 26' (beveled edges 74, 76 and projecting edge of the film of the identification device 27 so as to be flush with the shoulders 49'). During the second injection molding operation the core 14b is covered by the layer 16b, which covers the shoulders 49' of the insert 26' flush with the outside faces 52', 54' of the insert.

FIG. 7c corresponds to another chip structure similar to that of the chip 10, but in which body/insert fastening is effected, again in the central aperture of the body 12c of the chip, at the level of a central aperture of the covering layer 16c. In particular, the body 12c includes an injection-molded annular core 14c of greater diameter than the insert 26'. During the second injection molding operation, the covering layer 16c envelops the core 14c until it covers all of the edge 48' of the insert 26', including the shoulders 49' of the insert 26', until it is flush with the outside faces 52', 54' of the insert.

Of course, the invention is not limited to gaming chips or casino chips but relates equally to all types of chip in the form of a disk with an injection-molded plastics material body integrating an electronic identifier, such as, by way of non-limiting example, parking tokens, payment tokens and vouchers and identification badges for goods or persons.

The invention claimed is:

1. A chip having a generally disk shape, comprising:
a body having a central aperture;
an insert, positionable within the central aperture, comprising two rigid plates each having at least one central projection extending from a respective inside face and a contactless identification device, wherein the at least one central projection of each of the two rigid plates are coupleable to the respective opposing inside face of the rigid plate to define an area in which the contactless identification device is located,
wherein the two rigid plates further comprises a first rigid plate having a first central projection and a first central cavity on its inside face and a second rigid plate having a second central projection and a first groove on its inside face, wherein the first central cavity is configured to receive the second projection of the second plate and the first groove is configured to receive the first projection of the first rigid plate, and
wherein the first projection and the first groove are annular in shape and wherein the first central cavity is sized to receive the second projection such that at least a portion of the interior wall of the first projection substantially abuts at least a portion of the corresponding facing wall of the second projection.

2. The chip in accordance with claim 1, wherein the two rigid plates have central portions and the two rigid plates are couplable in their central portions, and the defined area is a peripheral annular area.

3. The chip in accordance with claim 1, wherein the contactless identification device comprises an electronic microchip and an associated antenna.

4. The chip in accordance with claim 1, wherein at least one of the two rigid plates includes at least one projection extending from a central portion of an inside face that defines the area and maintains a separation between inside faces of the two rigid plates.

5. The chip in accordance with claim 4, wherein the area defined by the central portion is a peripheral annular area around the at least one projection.

6. The chip in accordance with claim 4, wherein the contactless identification device comprises an antenna carried by a thin insulative film having at least one central aperture through which the at least one central projections passes.

7. The chip in accordance with claim 6, wherein the thin film is fixed by an adhesive to the inside face of the at least one plate.

8. The chip in accordance with claim 6, wherein at least a part of the antenna is formed by depositing conductive material on the thin insulative film.

9. The chip in accordance with claim 6, wherein the at least one central projection extending from respective inside faces of the two rigid plates comprise crenellated rings.

10. The chip in accordance with claim 9, wherein the crenelated rings are concentrically arranged and angularly offset with respect to each other, such that groove portions on an inside face of one plates is structured and arranged to receive a corresponding projections on an inside face of the other plate.

11. The chip in accordance with claim 10, wherein heights of the projections and depths of the grooves are selected to define the area when the two plates are coupled together, and the defined area is a peripheral annular area.

12. The chip in accordance with claim 1, wherein at least one of the two rigid plates includes an annular abutment extending from a periphery of an inside face to protect the contactless identification device from at least one of crushing and ingress of material into the area.

13. The chip in accordance with claim 3, wherein the electronic microchip operates in a frequency range from 10 to 17 MHz.

14. The chip in accordance with claim 3, wherein the electronic microchip operates in a frequency range from 2 to 5 GHz.

15. The chip in accordance with claim 1, wherein the insert is generally disk-shaped and the contactless identification device comprises a loop antenna with a diameter from 25 to 30 mm.

16. The chip in accordance with claim 1, wherein the insert is further composed of two oriented detectable-film patches of one of an active material or an alloy sensitive to electromagnetic radiation.

17. The chip in accordance with claim 16, wherein the two oriented detectable-film patches are arranged in a cross orientation.

18. The chip in accordance with claim 17, wherein the two oriented detectable-film patches are oriented at substantially 90° to each other.

19. The chip in accordance with claim 1, wherein the two rigid plates comprise plastic material.

20. The chip in accordance with claim 19, wherein the plastic material contains weighting charges compatible with contactless RFID transmission.

21. The chip in accordance with claim 1, wherein the body is composed of plastic material injection-molded around the insert, wherein the injection-molded plastic material further at least one of overlaps at least a periphery of the insert and enters into an edge of the insert.

22. The chip in accordance with claim 21, wherein the insert comprises an edge formed with at least one of a beveled portion, a rounded portion, and a grooved portion.

23. The chip in accordance with claim 1, wherein the body includes two faces, and a cavity on each face into which a label carrying at least one of a decoration, a mark, and a hologram is fixed.

24. The chip in accordance with claim 1, wherein the chip is a gaming chip or a casino chip.

25. A chip having a generally disk shape, comprising:
a body having a central aperture;
a first rigid plate having at least two concentric and angularly offset crenelated rings forming at least two projections extending from an inside face of said first rigid plate and at least two grooves disposed adjacent said two projections on said inside face of said first rigid plate, wherein said at least two grooves are configured to receive corresponding at least two concentric and angularly offset crenelated rings forming two projections from a second rigid plate;
a second rigid plate having at least two concentric and angularly offset crenelated rings forming at least two projections extending from an inside face of said second rigid plate and at least two grooves disposed adjacent said two projections on said inside face of said second rigid plate, wherein said at least two grooves are configured to receive corresponding at least two concentric and angularly offset crenelated rings forming two projections;
an insert, positionable within the central aperture, said insert comprising the first and second rigid plates coupled together and a contactless identification device, said insert being assembled by coupling the at least two projections of the first rigid plate within the grooves of the second rigid plate and coupling the at least two projections of the second rigid plate within the grooves of the first rigid plate so as to define an area there between in which the contactless identification device is located.

26. The chip of claim 25, wherein the inside surface of the first rigid plate contacts at least one substantially planar surface of said at least two projections of said second rigid plate and the inside surface of the second rigid plate contacts at least one substantially planar surface of said at least two projections of said first rigid plate.

* * * * *